United States Patent
Izumo et al.

(10) Patent No.: US 8,017,878 B2
(45) Date of Patent: Sep. 13, 2011

(54) SUPPORT STRUCTURE OF MASS SENSOR USED IN SCALES

(75) Inventors: Naoto Izumo, Kitamoto (JP); Akiyoshi Oota, Kitamoto (JP)

(73) Assignee: A&D Company, Ltd., Tokyo (JP)

( * ) Notice: Subject to any disclaimer, the term of this patent is extended or adjusted under 35 U.S.C. 154(b) by 364 days.

(21) Appl. No.: 12/227,682

(22) PCT Filed: May 21, 2007

(86) PCT No.: PCT/JP2007/060368
§ 371 (c)(1),
(2), (4) Date: Nov. 24, 2008

(87) PCT Pub. No.: WO2007/136031
PCT Pub. Date: Nov. 29, 2007

(65) Prior Publication Data
US 2009/0173551 A1    Jul. 9, 2009

(30) Foreign Application Priority Data
May 23, 2006   (JP) .................................. 2006-142627

(51) Int. Cl.
*G01G 3/00* (2006.01)
*G01G 23/00* (2006.01)
*G01G 21/28* (2006.01)

(52) U.S. Cl. .................................. 177/184; 177/210 EM (58) Field of Classification Search .......... 177/184–189, 177/210 EM, 212, 229
See application file for complete search history.

(56) References Cited

U.S. PATENT DOCUMENTS
5,604,336 A * 2/1997 Johnson ........................ 177/229
6,501,032 B2 * 12/2002 Luchinger et al. ............ 177/184

FOREIGN PATENT DOCUMENTS
| JP | 55-110920 A | * | 8/1980 |
| JP | 55-149018 A | * | 11/1980 |
| JP | 2001-91349 A | * | 4/2001 |
| JP | 2001-228016 A | * | 8/2001 |

* cited by examiner

*Primary Examiner* — Randy W Gibson
(74) *Attorney, Agent, or Firm* — Jordan and Hamburg LLP (57) ABSTRACT

The present invention protects a mass sensor from an overload in any direction. A support structure is accommodated in a case, has a floating frame provided on one end side and a fixed portion provided on the other end side, receives a load of an object to be weighed placed on a scale pan with the aid of the floating frame part, and supports the mass sensor used in scales to detect the mass of the object to be weighed. The support structure has a spring member for supporting the mass sensor, and is interposed between the fixed portion and the case, which are structural members. The spring member is elastically deformed in advance to thereby press/urge on the fixed portion of the mass sensor and cause the portion to come into contact with the structural member side. The spring member deforms elastically so that the fixed portion separates from the contact location when a force greater than the pressing/urging force is applied.

6 Claims, 7 Drawing Sheets

SUPPORT STRUCTURE OF MASS SENSOR USED IN SCALES

BACKGROUND OF THE INVENTION

The present invention relates to a support structure for a mass sensor used in scales, and more particularly relates to a support structure provided with a shock absorbing function for preventing an excessive load from being applied to the mass sensor when an overload has been applied.

A function for absorbing an overload on a scale pan is added to ordinary weighing scales in order to reduce the overload applied to a mass sensor. This function and the functional components are referred to as a shock absorber. The shock absorber is provided with a spring member that is displaced when a load equal to a preset weighting capacity+a is applied between the pan and a pan stop, or the same type of spring member is provided to a floating frame part that functions as a load receiver of the sensor.

For example, a configuration is proposed in which a plate spring member having the shape of the letter "c" is interposed on the pre-stage side of the moveable end in load-cell scales, as is disclosed in Japanese Laid-open Patent Publication No. 2001-091349. Also, in Japanese Laid-open Patent Publication No. 2001-228016, a support structure for a mass sensor used in scales is proposed in which there are provided at least one support post connected to the mass sensor, a support spring for supporting the support post, and a guide member for restricting the perpendicular movement of the support post in a state in which the support post is set at a distance from the support spring.

However, the conventional shock absorber and the support structure for a mass sensor used in scales have the following technical problems.

SUMMARY OF THE INVENTION

In other words, all conventional shock absorbers, including what is disclosed in Japanese Laid-open Patent Publication No. 2001-91349, have a structure in which a spring member is interposed on the pre-stage side of a mass sensor. Since a measurement error is generated when a load that can be weighed is not transmitted directly to the mass sensor, the configuration is complex, is only effective against an overload from directly above, and cannot effectively protect the mass sensor from an overload in lateral direction generated when the scales are in use.

Also, at least three constituent members are necessary in the support structure proposed in Japanese Laid-open Patent Publication No. 2001-228016, making the structure complex, providing only a cushioning function for impacts applied in a vertical direction, and making it impossible to effectively protect the mass sensor from an overload in the lateral direction.

In view of the foregoing conventional problems, an object of the present invention is to provide a support structure for a mass sensor used in scales in which a simple structure is used and the mass sensor used in scales can be protected from an overload not only from a vertical direction, but also from all directions including the lateral direction.

The present invention, in order to attain the above object, provides a support structure for a mass sensor used in scales, comprising a floating frame portion for receiving a load, the portion being accommodated in a case and provided on one end side; and a fixed portion provided to the other side, wherein a weight of an object to be weighed placed on the scale pan is received by a receiving part and a mass of the object to be weighed is detected; the support structure for a mass sensor used in scales characterized in comprising a spring member for supporting the mass sensor, the member being interposed between the fixed portion and the case, which are structural components, wherein the spring member is elastically deformed in advance to thereby press/urge the fixed portion of the mass sensor to make contact with the structural component side, and elastically deforms so that the fixed portion separates from the contact location when a force greater than the pressing/urging force is applied.

According to the support structure for a mass sensor used in scales composed as above, the spring member interposed between the fixed portion and the case, which are structural components, is elastically deformed in advance, whereby the fixed portion of the mass sensor is pressed/urged so as to contact a structural member side, and when a force greater than the pressing/urging force is applied, the spring member is elastically deformed so that the fixed portion separates from the contact location. Therefore, when a load less than the pressing/urging force is transmitted directly to the mass sensor and an overload greater than the pressing/urging force is applied, the fixed portion of the mass sensor separates from the contact location, the overload is applied to the spring member, and the spring member undergoes an elastic deformation at this point, whereby the effect of the overload is absorbed. When the overload is removed, the mass sensor returns to the initial state when the spring member is restored.

Such cushioning and recovery functions of the spring member are exhibited in relation to an overload not only in a vertical direction but also from any direction including the lateral direction. Also, since this effect is obtained by merely interposing the spring member for supporting the mass sensor between the fixed portion and structural members of the case, a single constituent member is sufficient and the structure is made simple. Therefore, the reliability as a shock absorber is enhanced.

In the present invention, the case may be provided with upper and lower cases that mutually fit together, and the contact location of the fixed portion may be composed of a sensor contact portion suspended from the upper case or erectly formed on the lower case.

In the present invention, a positioning portion of the fixed portion composed of a protrusion, fitting portion, or the like may be provided to the sensor contact portion.

The spring member in the present invention may be composed of a plate spring in which the side surface is shaped as the letter "c."

In the present invention, the spring member may be composed of a plate spring in which the side surface has a substantially crank shape.

In the present invention, the fixed portion of the mass sensor may have an elongated portion in which one end side is integrally elongated, and the elongated portion is used as the spring member.

In the present invention, a connection location on the side of the fixed portion of the mass sensor in the plate spring shaped as the letter "c" can be fashioned into a narrower shape than a main body portion.

According to the support structure for a mass sensor used in scales according to the present invention, the mass sensor can be protected from an overload not only from a vertical direction, but also from all directions, including the lateral direction, by using a simple configuration.

DETAILED DESCRIPTION OF THE INVENTION

Suitable embodiments of the present invention will be described in detail hereunder with reference to the accompanying diagrams. FIGS. 1 through 4 show a first embodiment of a support structure for a mass sensor used in scales according to the present invention.

Figure 1:
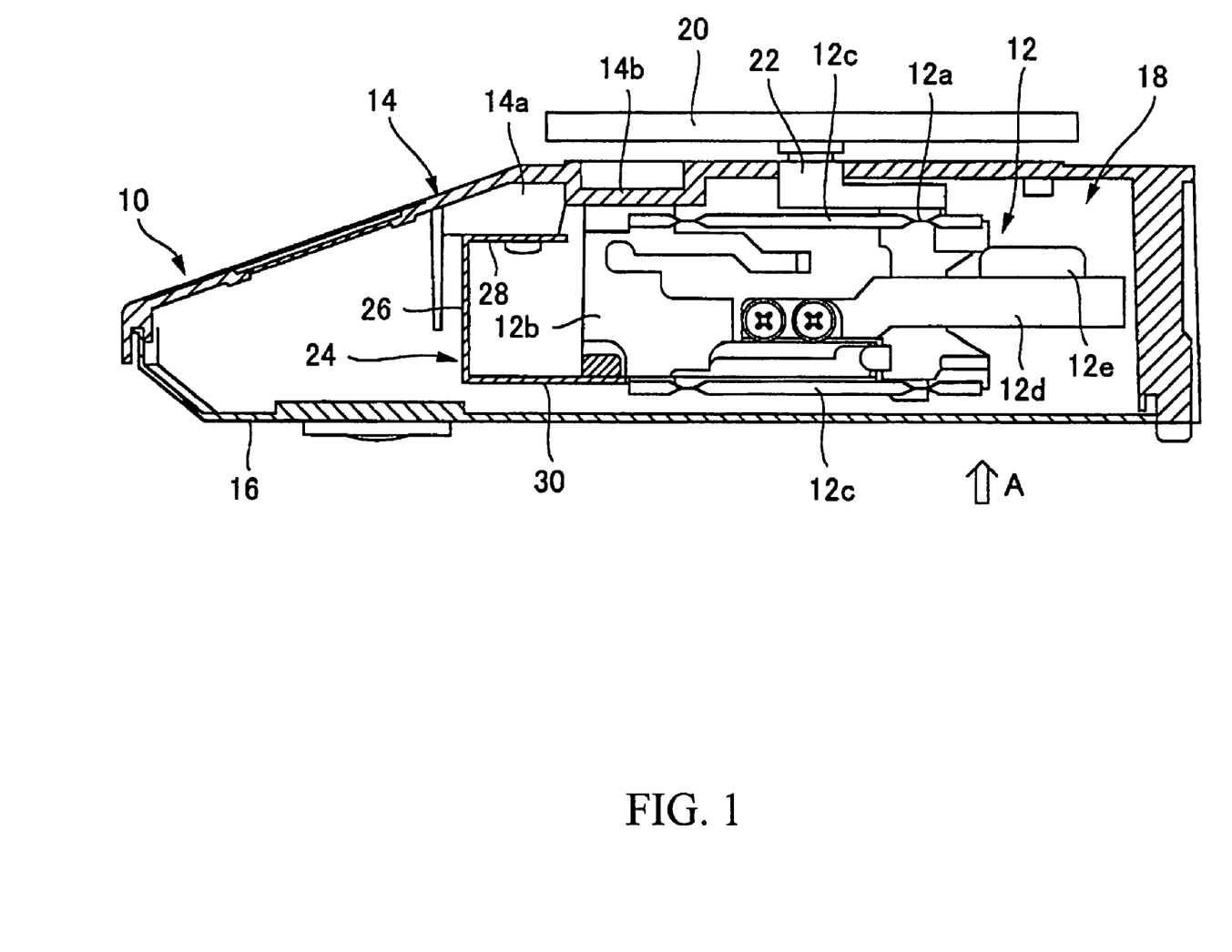
FIG. 1 is a cross-sectional schematic view showing a first embodiment of a support structure for a mass sensor used in scales according to the present invention.
Figure 2:
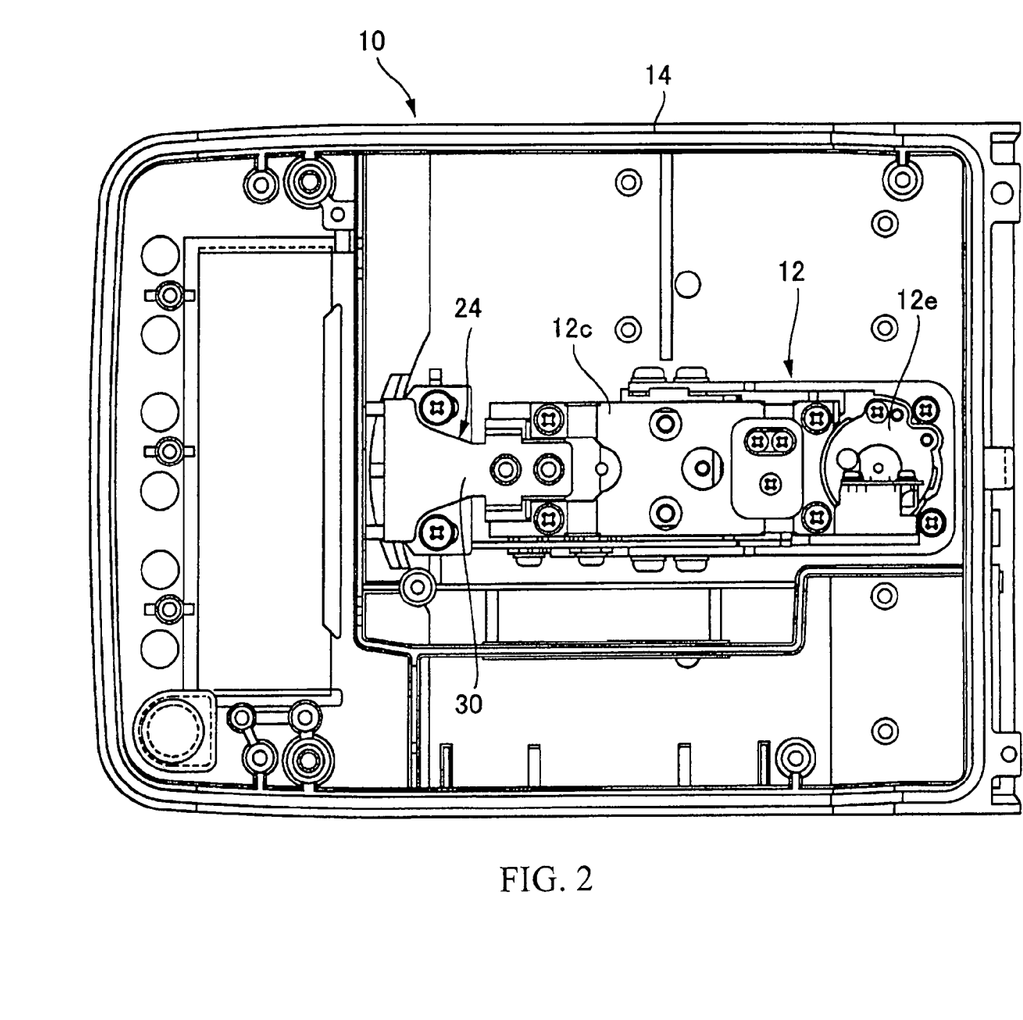
FIG. 2 is a plan view in the direction of arrow A in FIG. 1 when the lower case has been removed in the scales of FIG. 1.

The embodiment shown in these drawings is a case in which the present invention has been applied to magnetic-balance electronic scales. The electronic scales have a case 10 and a mass sensor 12 accommodated in the case 10. However, the embodiments of the present invention are not necessarily limited to such a magnetic-balance mass sensor 12 and may also be applied, e.g., to a strain gauge mass sensor.

The case 10 is provided with an upper case 14 and a lower case 16 whose peripheral edges are fitted with each other. A space 18 is partitioned off in the case 10, and the mass sensor 12 is disposed in the space 18.

The mass sensor 12 according to the present embodiment is a magnetic-balance sensor, and is provided with a floating frame part 12a disposed at one end so as to be capable of movement in the vertical direction, and a fixed portion 12b disposed at the other end facing the floating frame part 12a.

A plurality of stays 12c arranged in parallel to form a Roberval mechanism are provided to the top and bottom surfaces of the mass sensor 12, and also provided are a lever 12d for transmitting a load, and the main body of the magnetic-balance sensor 12e.

A load-transmitting member 22 protrudingly disposed on the bottom surface of the scale pan 20 is fixed to the top surface of the floating frame part 12a. The floating frame part 12a is the receiving part for receiving a load of an object to be weighed that is placed on the scale pan 20.

The support structure for the mass sensor 12 is configured in the manner described below in the case of the present embodiment. The mass sensor 12 has a spring member 24 interposed between the fixed portion 12b of the mass sensor and the lower surface of the upper case 14, and is thereby floatably supported so that the lower end surface of the mass sensor 12 is set at a predetermined distance upward from the upper surface of the lower case 16.

The spring member 24 according to the present embodiment is a plate spring in which the side surface having a main unit 26 and a pair of first and second moveable pieces 28, 30 facing the two ends of the main unit 26 is formed in the shape of the letter "c," and is formed by bending the two ends of a plate-shaped metal plate of a predetermined width substantially 90° so as to face one another.

This type of spring member 24 has the first moveable piece 28, which is on the upper side, fixed to a spring-fixing portion 14a integrally suspended from the lower surface of the upper case 14, and the second moveable piece 30, which is on the lower side, fixed to the lower surface of the fixed portion 12b of the mass sensor 12.

Figure 3:
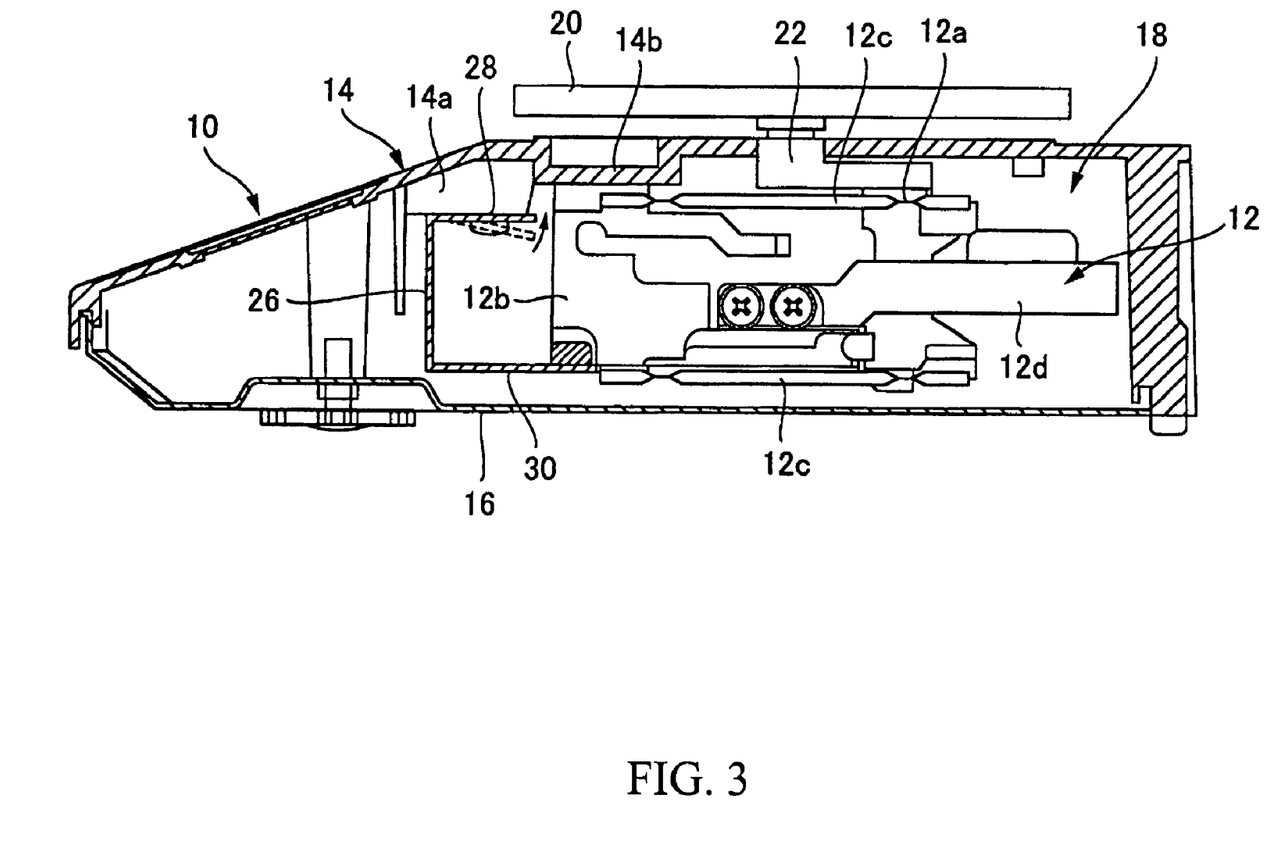
FIG. 3 is a cross-sectional schematic view of a case in which a mass sensor is mounted via a spring member in the support structure shown in FIG. 1.

When the spring member 24 is used to support the mass sensor 12, one of the moveable pieces 28 is bent and elastically deformed in advance so as to approach the other moveable piece 30, as shown by the dotted line in FIG. 3, so that an offset load is applied when the mass sensor 12 is supported.

In other words, when the first moveable piece 28 is bent in advance so as to approach the other moveable piece 30, as shown by the dotted line in FIG. 3, and the first moveable piece 28 is affixed with screws to the flat surface of the spring-fixing portion 14a, a state results in which the second moveable piece 30 has moved upward by a distance commensurate with the amount of the bending carried out in advance.

When the second moveable piece 30 moves upward, the mass sensor 12 also moves upward in accompaniment with the movement. A sensor contact portion 14b is provided to the upper end side of the mass sensor 12, the portion being disposed adjacent to the upper surface of the fixed portion 12b close to a side of the spring-fixing portion 14a, and being suspended so as to form a step.

In this type of positional relationship, when the mass sensor 12 moves above the second moveable piece 30, the upper end surface of the fixed portion 12b makes contact so as to press upon the lower surface of the sensor contact portion 14b.

It also possible to, e.g., provide the sensor contact portion 14b with a protrusion that interlocks with and positions the upper end edge of the fixed portion 12b, or to provide a concavity that corresponds to the external peripheral shape of the fixed portion 12b and fits onto the fixed portion 12b to thereby position the fixed portion.

Also, in the present embodiment, the spring member 24 is provided with an elongated part integrally formed on the lower end portion of the fixed portion 12b of the mass sensor 12, and the elongated part is bent into a predetermined shape to thereby constitute the spring member 24.

The pressing/urging force in this case can be adjusted using the offset load of the spring member 24. The offset load is set to a load in which a predetermined safety factor a is added to a maximum value that can be weighed by the scales. In the case of the present embodiment, the second moveable piece 30 is formed in a narrow shape so as to have substantially ½ the width of the main unit 26 and the first moveable piece 28, as shown in FIG. 1.

In scales provided with a support structure for the mass sensor configured in the manner described above, when an object to be weighed up to the maximum mass that can be measured with a predetermined precision is placed on the scale pan 20, as shown in FIG. 3, the load of the object to be weighed is less than the offset load in which the fixed portion 12b of the mass sensor 12 is pressed and urged against the sensor contact portion 14b. Therefore, the fixed portion 12b is maintained in such a contact state without being separated from the lower surface of the sensor contact portion 14b, the load of the object to be weighed is applied to the mass sensor 12, and the load value is measured with a predetermined precision.

Figure 4:
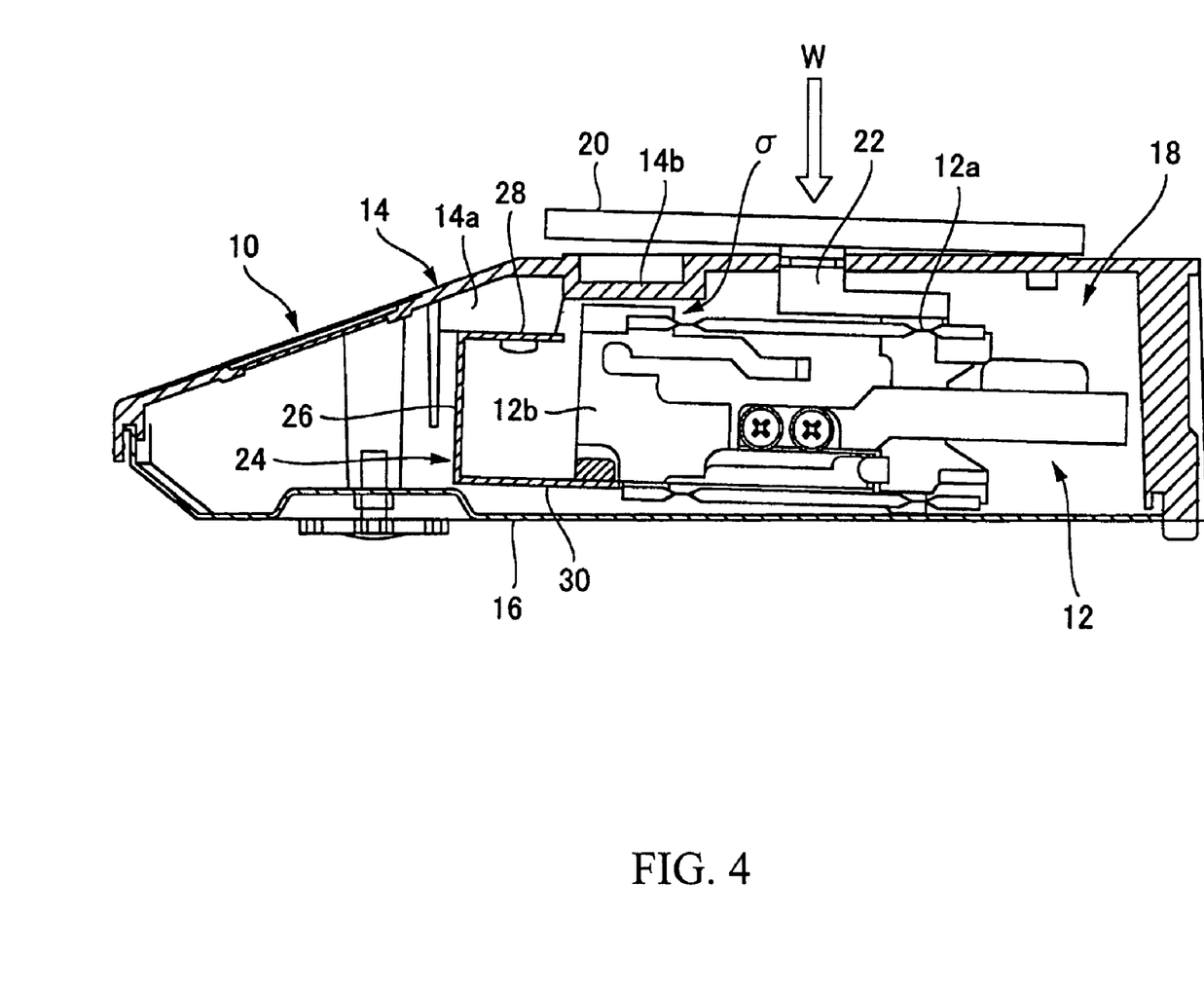
FIG. 4 is a cross-sectional schematic of view of a case in which an overload has operated in the scales shown in FIG. 1.

On the other hand, when a force (overload W) greater than the pressing/urging force whereby the scale pan 20 is caused to move downward is applied on the front side of the scale pan 20, the fixed portion 12b separates downward from the sensor contact portion 14b, as shown in FIG. 4.

In other words, for example, when an overload W greater than the pressing/urging force is applied to the scale pan 20, the fixed portion 12b of the mass sensor 12 overcomes the urging force of the spring member 24, and separates from the sensor contact portion 14b of the upper case 14 by a distance commensurate with predetermined interval d, as shown in FIG. 4.

When the mass sensor 12 separates from the sensor contact portion 14b in this way, the overload W is applied to the spring member 24 and, as a result, the spring member 24 undergoes an elastic deformation at this time, whereby the overload effect is absorbed. When the overload W is removed, the mass sensor 12 returns to the initial state when the spring member 24 is restored.

The cushioning and recovery functions of the spring member 24 are exhibited in relation to the overload W not only in a vertical direction but also from any direction, including the lateral direction. Also, since this effect is obtained by merely interposing the spring member 24 for supporting the mass sensor 12 between the fixed portion 12b and the sensor contact portion 14b, a single constituent member is sufficient and the structure is made simple.

Figure 5:
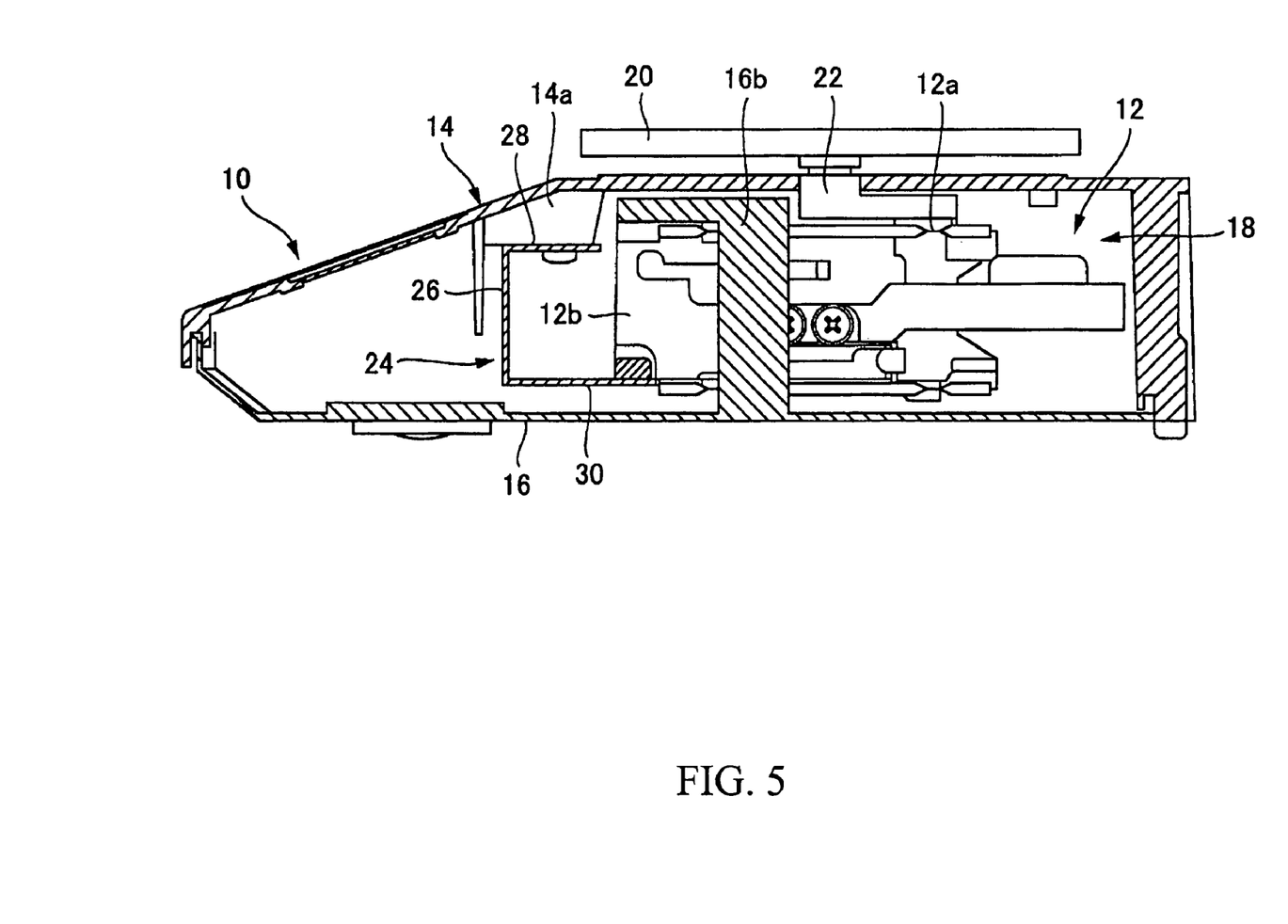
FIG. 5 is a cross-sectional schematic view showing a second embodiment of the support structure for a mass sensor used in scales according to the present invention.

FIG. 5 shows a second embodiment of a support structure for a mass sensor used in scales according to the present invention. The same or corresponding portions to the first embodiment are assigned the same reference numerals, and a detailed description thereof is omitted. Hereinafter, only characteristic features are described.

The support structure for the mass sensor 12 according to the present embodiment has a spring member 24 interposed between the fixed portion 12b and the lower surface side of the upper case 14 in the same manner as in the first embodiment, and is thereby floatably supported so that the lower end surface of the mass sensor 12 is set at a predetermined distance upward from the upper surface of the lower case 16.

The spring member 24, in the same manner as in the embodiment described above, is a plate spring in which the side surface having a main unit 26 and a pair of first and second moveable pieces 28, 30 facing the two ends of the main unit 26 is formed in the shape of the letter "c," and is formed by bending the two ends of a plate-shaped metal plate having a predetermined width substantially 90° so as to face one another.

The spring member 24 has the first moveable piece 28 fixed to a spring-fixing portion 14a integrally suspended from the lower surface of the upper case 14, and the second moveable piece 30, which is the other member of the pair, fixed to the lower surface of the fixed portion 12b of the mass sensor 12.

When the spring member 24 is used to support the mass sensor 12, one of the moveable pieces 28 is bent and elastically deformed in advance so as to approach the other moveable piece 30, in the same manner as in the embodiment described above, so that an offset load is applied when the mass sensor 12 is supported.

On the other hand, a sensor contact portion 16b having substantially the shape of the letter "L" erectly formed facing upward from the lower surface of the lower case 16 is provided to the upper end side of the mass sensor 12. The sensor contact portion 16b is designed so that an offset load is applied to the spring member 24, and when fixed to the spring-fixing portion 14a, the upper end surface of the fixed portion 12b is contacted so as to be pressed against the lower surface of the sensor contact portion 16b when the mass sensor 12 also moves upward in accompaniment with the upward movement of the moveable piece 30. The pressing/urging force at this time is set to the same load as in the embodiment described above.

In the second embodiment configured in this manner, the same behavior as that in the first embodiment is exhibited and the same operational effect can be achieved in each of the cases in which an object to be weighed that is within the maximum mass that can be measured with a predetermined precision is placed on the scale pan 20, and an overload W is applied.

Figure 6:
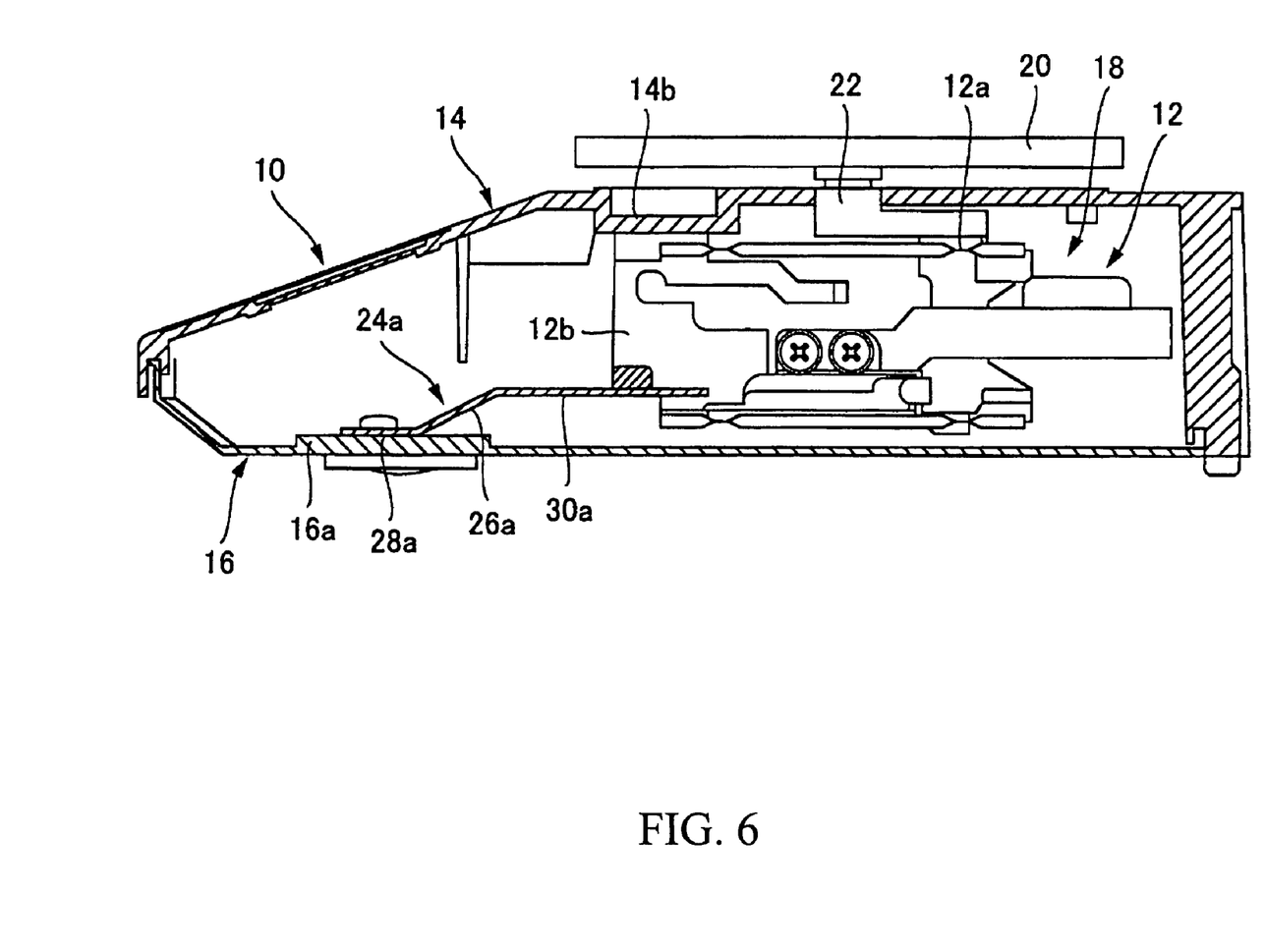
FIG. 6 is a cross-sectional schematic view showing a third embodiment of the support structure for a mass sensor used in scales according to the present invention.

FIG. 6 shows a third embodiment of a support structure for a mass sensor used in scales according to the present invention. The same or corresponding portions to the first embodiment are assigned the same reference numerals, and a detailed description thereof is omitted. Hereinafter, only characteristic features are described.

The support structure for the mass sensor 12 according to the present embodiment has a spring member 24a interposed between the fixed portion 12b of the mass sensor 12 and the upper surface side of the lower case 16 in the same manner as in the first embodiment, whereby the lower end surface of the mass sensor 12 is floatably supported so as to be separated upward from the upper surface of the lower case 16 by a predetermined distance.

In the case of the present embodiment, the spring member 24a is a plate spring in which the side surface having a main unit 26a and a pair of first and second moveable pieces 28a, 30a extended from the two ends of the main unit 26a is formed substantially in the shape of a crank, and is formed by bending the two ends of a plate-shaped metal plate having a predetermined width so as to be parallel to one another.

The spring member 24a is configured so that the first moveable piece 28a is fixed to the spring-fixing portion 16a formed protrudingly and integrally on the lower surface of the lower case 16, and the second moveable piece 30 is fixed to the lower surface of the fixed portion 12b of the mass sensor 12.

When the spring member 24a is used to support the mass sensor 12, one of the moveable pieces 28a is bent and made to elastically deform in advance so as to approach the other moveable piece 30a in the same manner as in the above embodiment, so that an offset load is applied when the mass sensor 12 is supported.

On the other hand, a sensor contact portion 14b that protrudes downward in the form of a step toward the upper end side of the mass sensor 12 is provided to the lower surface side of the upper case 14. The sensor contact portion 14b is configured so that when an offset load is applied to the spring member 24a, which is fixed to the spring-fixing portion 16a, the upper end surface of the fixed portion 12b is brought into contact with and made to press against the lower surface of the sensor contact portion 14b when the mass sensor 12 moves upward in accompaniment with the upward movement of the moveable piece 30a. The pressing/urging force at this time is set to the same load as in the embodiment described above.

In the third embodiment configured in this manner, when an object to be weighed that is within the maximum mass that can be measured with a predetermined precision is placed on the scale pan 20, the load of the object to be weighed is less than the offset load in which the fixed portion 12b of the mass sensor is pressed/urged against the sensor contact portion 14b. Therefore, the fixed portion 12b is maintained in such a contact state without being separated from the lower surface of the sensor contact portion 14b, the load of the object to be weighed is applied to the mass sensor 12, and the load value is measured with a predetermined precision.

On the other hand, when a large force (overload) greater than the pressing/urging force that causes the scale pan 20 to move downward is applied on the front side of the scale pan 20, the urging force of the spring member 24a is overcome and the fixed portion 12b is separated downward from the sensor contact portion 14b. Therefore, the overload W is applied to the spring member 24a, and the spring member 24a undergoes an elastic deformation at this time, whereby the overload effect is absorbed.

When the overload W is removed, the mass sensor 12 is returned to the initial state by the restoring effect of the spring member 24. The same operational effect is obtained as in the first embodiment.

Figure 7:
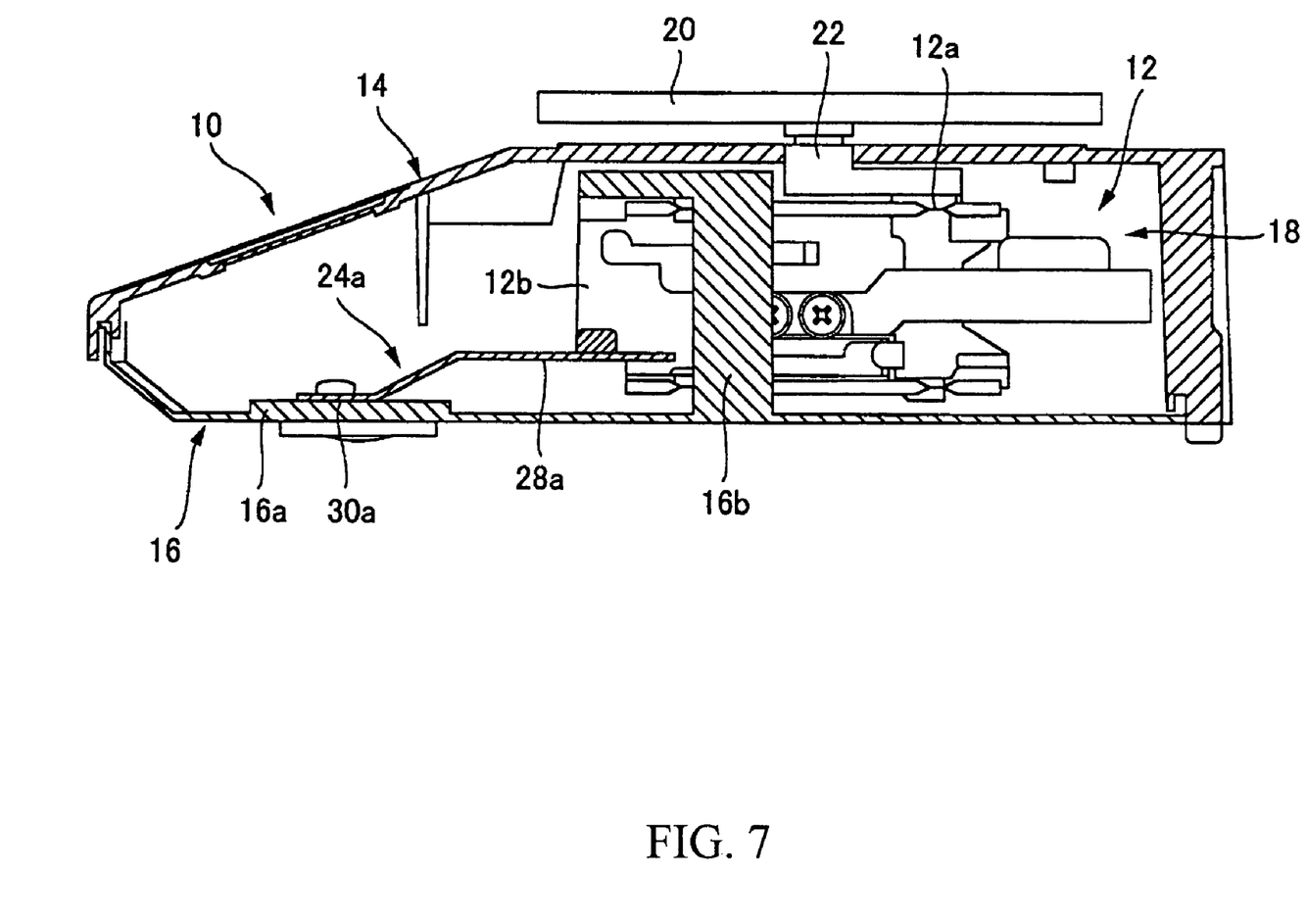
FIG. 7 is a cross-sectional schematic view showing a fourth embodiment of the support structure for a mass sensor used in scales according to the present invention.

FIG. 7 shows a fourth embodiment of a support structure for a mass sensor used in scales according to the present invention. The same or corresponding portions to the first embodiment are assigned the same reference numerals, and a detailed description thereof is omitted. Hereinafter, only characteristic features are described.

In the support structure for the mass sensor 12 according to the present embodiment, a spring member 24a having the same shape as that in the third embodiment is interposed between the fixed portion 12a of the mass sensor 12 and the upper surface side of the lower case 16, whereby the lower end surface of the mass sensor 12 is floatably supported so as to be separated upward from the upper surface of the lower case 16 by a predetermined distance.

In the same manner as in the third embodiment, the spring member 24a is a plate spring in which the side surface having a main unit 26a and a pair of first and second moveable pieces 28a, 30a extended from the two ends of the main unit 26a is formed substantially in a crank shape.

In the same manner as in the third embodiment, the first moveable piece 28a of the spring member 24a is fixed to the spring-fixing portion 16a, which is integrally and protrudingly formed on the lower surface of the lower case 16; the second moveable piece 30 is fixed to the lower surface of the fixed portion 12b of the mass sensor 12; and an offset load is applied in this situation.

On the other hand, a sensor contact portion 16b having substantially the shape of the letter "L" erectly formed facing upward from the lower surface of the lower case 16 is provided to the upper end side of the mass sensor 12. The sensor contact portion 16b is designed so that an offset load is applied to the spring member 24, and when fixed to the spring-fixing portion 14a, the upper end surface of the fixed portion 12b is contacted so as to be pressed against the lower surface of the sensor contact portion 16b when the mass sensor 12 also moves upward in accompaniment with the upward movement of the moveable piece 30a. The pressing/urging force at this time is set to the same load as in the first embodiment.

In the fourth embodiment configured in this way, the same behavior as that in the third embodiment is exhibited and the same operational effect can be achieved in each of the cases in which an object to be weighed that is within the maximum mass that can be measured with a predetermined precision is placed on the scale pan 20, and an overload W is applied.

In the embodiments described above, a case was described in which a plate spring is used as means to floatably support a mass sensor 12. However, implementation of the present invention is not necessarily limited to these embodiments, and, e.g., a coil spring may be used.

INDUSTRIAL APPLICABILITY

In accordance with the support structure for a mass sensor used in scales according to the present invention, a mass sensor can be protected from an overload not only from a vertical direction, but also from all directions, including the lateral direction, by using a simple configuration, and the technology can therefore be effectively utilized in fields that use such a configuration.

The invention claimed is:

1. A support structure for a mass sensor used in scales, comprising
a floating frame portion for receiving a load, the portion being accommodated in a case and provided on one end side;
a fixed portion provided to the other side, wherein a weight of an object to be weighed placed on a scale pan is received by a receiving part and a mass of the object to be weighed is detected; and
a C-shaped spring member being vertically arranged and provided with a first moveable horizontal extending arm that is fixed to the fixed portion, the C-shaped spring member supporting said mass sensor, the C-shaped spring member being interposed between the fixed portion and the case; wherein
the fixed portion and the case are structural components, and
the C-shaped spring member is elastically deformed in advance to thereby apply pressing/urging force to the fixed portion of the mass sensor to make contact with a structural component side, and elastically deforms so that the fixed portion separates from the contact location when a force greater than the pressing/urging force is applied.

2. The support structure for a mass sensor used in scales according to claim 1, wherein:
the case is provided with upper and lower cases that mutually fit together; and
the contact location of the fixed portion comprises a sensor contact portion suspended from the upper case or erectly formed on the lower case.

3. The support structure for a mass sensor used in scales according to claim 2, wherein a positioning portion of the fixed portion comprises a protrusion or a fitting portion on the sensor contact portion.

4. The support structure for a mass sensor used in scales according to claim 1, wherein the C-shaped spring member is provided with an elongated part joined integrally to a lower end portion of the fixed portion of the mass sensor.

5. The support structure for a mass sensor used in scales according to claim 2, wherein the C-shaped spring member further comprises a second moveable horizontal arm that is fixed to a spring-fixing portion integrally suspended from a lower surface of the upper case, the first moveable horizontal extending arm being fixed to a lower portion of the fixed portion of the mass sensor, and a vertical main piece interconnecting the first and second moveable horizontal arms.

6. The support structure for a mass sensor used in scales according to claim 5, wherein the second moveable horizontal arm is narrower than the vertical main piece.

* * * * *